United States Patent Office 2,802,870
Patented Aug. 13, 1957

2,802,870

METHOD FOR THE PREPARATION OF ε-ACYL-AMIDO-α-BROMOCAPROIC ACIDS

Yancey J. Dickert and Edgar C. Britton, Midland, Mich., assignors to The Dow Chemical Company, Midland, Mich., a corporation of Delaware No Drawing. Application November 28, 1952, Serial No. 323,127

8 Claims. (Cl. 260—518)

This invention relates to an improved method for the production of ε-acylamido-α-bromocaproic acids such as ε-benzamido-α-bromocaproic acid and the new compound ε-acetamido-αbromocaproic acid. The products can be converted to lysine, an essential amino acid, by reaction with ammonia and subsequent hydrolysis.

It is common practice to brominate valeric and caproic acids directly to the corresponding alpha-substituted acid in good yield. The reaction proceeds smoothly and the brominated product may be isolated readily in a satisfactorily pure state.

In the prior processes for the direct bromination of substituted caproic acids containing amine residues, such as ε-benzamido caproic acid, a reaction occurs that is difficult to control due to poor heat transfer in the mixture. It has been the practice to add a sufficient amount of a phosphorus bromide or of its elemental constituents to benzamido-caproic acid to form primarily ε-benzamido-α-bromocaproyl bromide as the reaction product, which is obtained as a crude gummy mass and is difficult to handle, especially in commercial scale operations. After bromination, the gummy mass of the benzamido bromo-acyl bromide is difficultly hydrolyzed to ε-benzamido-α-bromocaproic acid, especially when large quantities are involved, due to the sudden generation of large quantities of heat during neutralization of the acidic components by the basic hydrolyzing medium. A further disadvantage is the fact that the hydrolyzed product commonly sets up in the form of a solid cake. In order to purify this product it has been necessary to pulverize the cake, wash the finely-divided product so-obtained, and subsequently crystallize it several times from an appropriate solvent. In an attempt to overcome some of these difficulties, the use of carbon tetrachloride has been proposed as the reaction medium during the bromination, while still using the conventional large amounts of phosphorus and bromine, but the yield of final product is reported to be substantially decreased by such use, and this is commercially undesirable.

It is, therefore, an object of the present invention to provide a simple, efficient, and economical method for the large scale production of substantially pure ε-acylamido-α-bromocaproic acids in high yield. A related object is to prepare the compound ε-acetamido-α-bromocaproic acid. Other objects will be apparent from the following description of the invention.

It has now been found that a substantially pure ε-acylamido-α-bromocaproic acid can be obtained in good yield by brominating the ε-acylamidocaproic acid in the presence of a catalytically small amount of a phosphorus halide in a chlorinated or brominated solvent more fully defined hereinafter. The bromination employs only a slight excess over the amount of bromine theoretically required to replace one hydrogen atom in the acylamido-caproic acid, and is continued until the reaction is substantially complete, as may be noted by cessation of hydrogen bromide liberation. The reaction temperature should be kept above 80° C. and preferably above 90° C. Temperatures above 100° C. are not necessary. The resulting solution or slurry of the acylamido-bromocaproic acid may be used as such or it may be mixed with an aqueous solution of a strong alkali, preferably an alkali metal hydroxide, to convert the brominated acid to a water-soluble salt and to extract such salt from the reaction mixture. Upon acidification of the alkaline extract, crystals of the ε-acylamido-α-bromocaproic acid separate in good yield. The product is substantially pure.

It is preferred that a solvent be employed in the process of the present invention. Effective solvents for the reaction may be selected from the class consisting of chlorinated and brominated alkanes of from 2 to 4 carbon atoms, which are liquid at room temperature and boil above 80° C., and the liquid chloro and bromo benzenes. Examples of suitable solvents are n-butyl bromide, secondary butyl bromide, isobutyl bromide, the ethylene and propylene chlorides, chlorobromides, and bromides, the dichloro- and dibromo-butanes, 1,1,2-trichloroethane, the tetrachloroethanes, pentachloroethane, acetylene tetrabromide, trichloropropanes, tribromopropanes, monochlorobenzene, monobromobenzene, orthodichlorobenzene, and the trichlorobenzenes. The amount of solvent employed in the reaction mixture is such that a mobile slurry of the organic acid is maintained. It is desirable to retain the solvent throughout reaction and subsequent conversion of the brominated organic acid to its salt. The usual reaction impurities, if formed, appear to remain in the organic solvent layer when the desired acid is extracted as a water soluble salt therefrom. The preferred solvents are those, such as ethylene bromide, which have a density greater than that of the reaction product and that of the alkaline solution used to extract that product.

The amount of bromine to be added is in the range of 1.1 to 2 moles per mole of the substituted caproic acid. When ethylene bromide is employed as a solvent, the preferred amount of bromine is 1.1 to 1.25 moles per mole of the organic acid. The mode of addition of bromine is not critical.

The catalyst may be any one of the phosphorus halides, such as phosphorus trichloride, pentachloride, tribromide, or pentabromide. Catalytic amounts of the phosphorus halide are employed, in the range of 0.1 to 0.6 mole per mole of the organic acid. Usually, an amount of catalyst in the lower end of this range, from 0.1 to 0.25 mole, is sufficient. Success of the process depends upon the use of the small catalytic amounts of the phosphorus halide, since larger quantities lead to the formation of the bromoacyl bromide, with attendant formation of the gummy cake and related difficulties found with the prior art methods.

In the present method it is unnecessary and undesirable to employ a large excess of bromine, as only slightly more than one mole of bromine per mole of the ε-acylamidocaproic acid is required, and only the α-carbon atom and not the carboxyl group of the organic acid is brominated. Hence, the previously necessary step of hydrolyzing an acyl bromide group has been eliminated. Furthermore, large scale production of the desired compound is more efficiently accomplished, since a fluid mixture of the brominated ε-acylamido-α-bromocaproic acid in the solvent is obtained instead of a gummy cake of the caproyl halide. Removal of the solvent from the brominated reaction mixture is neither necessary nor desirable before converting the brominated acid to its salt. In fact, during the step of neutralizing the brominated acid to its sodium salt with a dilute aqueous alkali solution, the solvent serves to retain organic impurities whereas the brominated benzamido caproic acid forms a salt which dissolves in the dilute solution of alkali. This is accomplished efficiently by slowly adding the reaction mixture to the dilute alkali solution with mechanical agitation and adequate cooling. Cooling is necessary in order to prevent hydrolysis of the brominated compound wherein the bromine would be removed. A 15 percent solution of sodium hydroxide in water is satisfactory for the purpose and sufficient solution of the alkali should be present so that all of the brominated acid may be neutralized upon complete addition of the reaction mixture. Agitation is discontinued and the aqueous solution of the sodium salt of the ε-acylamido-α-bromo-caproic acid is then separated from the organic layer. The sodium salt solution is then acidified with an aqueous mineral acid and the mixture is cooled. Conveniently, a small amount of sodium bisulphite is added during acidification to react with remaining traces of bromine. The crystals of the ε-acylamido-α-bromocaproic acid, formed during the cooling process, are separated from the mother liquor, and then washed and dried in the usual manner. Exceptionally high yields of the ε-acylamido-α-bromocaproic acid are obtained. The method is surprisingly simple, economical, and efficient for the large scale production of the brominated acid.

The following examples illustrate the method of the present invention but are not to be construed as limiting.

*Example 1*

In a 300-gallon glass-lined vessel, 1450 pounds (80 U. S. gallons) of ethylene bromide and 575 pounds (2.45 pound moles) of ε-benzamidocaproic acid were mixed with mechanical agitation. The stirred mixture was kept cool and 34 pounds (0.255 pound moles) of phosphorus trichloride was cautiously added. 480 pounds of bromine (3.0 pound moles) was gradually added to the stirred mixture over a period of 2 hours. At the end of this time, the mixture was heated at a temperature of 90°–95° C. for 9 hours and then cooled when evolution of HBr was essentially complete.

There was mixed in a large wooden tank, 144 U. S. gallons of water and 20 gallons (3.18 pound moles) of 50 percent sodium hydroxide. To the so-diluted solution of alkali, the brominated reaction mixture was added slowly and gradually with stirring, in order to maintain a temperature of 30° to 35° C., and a pH near or above 12 to facilitate salt formation and extraction. After complete addition, the alkaline mixture was stirred for an additional 30 minutes. Stirring was then discontinued and the aqueous alkaline layer containing the sodium salt of ε-benzamido-α-bromocaproic acid was separated from the ethylene bromide layer which was cycled back to a storage tank for purification and reuse.

The alkaline solution of sodium ε-benzamido-α-bromocaproate was added gradually, with adequate cooling and mechanical agitation, to a large kettle containing 3.4 pound moles of hydrochloric acid (originally introduced as a 32 percent solution) and 5 pounds of sodium bisulphite in 160 U. S. gallons of water. Crystallization of ε-benzamido-α-bromocaproic acid began immediately upon acidification and the resulting slurry was cooled to room temperature. The product was filtered, washed, and dried. The yield of ε-benzamido-α-bromocaproic acid was 743 pounds, or 96.7 percent, based on ε-benzamido-caproic acid employed. The melting point of the product was observed to be 163° C.

In a similar manner, experiments carried out using ethylene chloride as the solvent, with bromination at 82° C., produced ε-benzamido-α-bromocaproic acid in yields near 90 percent.

*Example 2*

One-tenth (0.1) mole of ε-acetamidocaproic acid was stirred with about 6 times its weight of ethylene bromide and 0.0115 mole of phosphorus trichloride. There was carefully added 0.117 mole of bromine. The mixture was heated in the course of an hour to 90° C., and was held at 90° C. for 4 hours, by which time evolution of hydrogen bromide had ceased. The reaction mixture was cooled to 50° C. and a volume of water about equal to that of the original ethylene bromide was added, to destroy any acyl halide and phosphorus halide. The mixture was heated to drive off the water-ethylene bromide azeotrope, and remaining water was removed by vacuum distillation. The undistillable oily product is the new compound, ε-acetamido-α-bromocaproic acid, $C_8H_{14}ONBr$, having the following analysis:

|    | Theory | Observed |
|----|--------|----------|
| C  | 38.10  | 38.83    |
| H  | 5.55   | 5.57     |
| N  | 5.55   | 5.21     |
| Br | 31.75  | 32.54    |

The oily product was converted to lysine (α,ε-diaminocaproic acid) by warming it with ammonia water and hydrolyzing the acetamido-α-amino caproic acid with excess alkali. The yield of dl-lysine was 68.5 percent, based on the original ε-acetamidocaproic acid.

This application is a continuation-in-part of our co-pending application Serial No. 254,212 filed October 31, 1951.

We claim:

1. The method of preparing ε-acylamido-α-bromocaproic acids which comprises the steps which consist in mixing an ε-acylamidocaproic acid and a small catalytic amount of a phosphorus halide with a solvent liquid medium which consists of a member of the group consisting of the liquid chloro- and bromobenzenes and the chlorinated and brominated alkanes of from 2 to 4 carbon atoms which are liquid at room temperature and boil above 80° C., adding from 1.1 to 2 moles of bromine to the solution for each mole of ε-acylamidocaproic acid, and maintaining a reaction temperature of at least 80° C. until bromination is essentially complete, the aryl group being one derievd from a carboxylic acid.

2. The method claimed in claim 1, wherein the acylamidocaproic acid is ε-benzamidocaproic acid.

3. The method claimed in claim 1, wherein the acylamidocaproic acid is ε-acetamidocaproic acid.

4. The method claimed in claim 1, wherein the liquid medium is ethylene bromide.

5. The method claimed in claim 1, wherein the liquid medium is ethylene chloride.

6. The method claimed in claim 1, wherein the liquid medium is a solvent which boils above 90° C. and the temperature of bromination is in the range 90° to 100° C.

7. The method claimed in claim 1, wherein, after substantial completion of the bromination reaction, the brominated acid is extracted from the reaction mixture with an aqueous alkali, and the ε-acylamido-α-bromocaproic acid is recovered from the so-formed aqueous alkaline solution of its salt.

8. The method for preparing ε-benzamido-α-bromocaproic acid which consists in mixing ε-benzamidocaproic acid and a small catalytic amount of phosphorus trichloride with ethylene bromide, adding about 1.25 moles of bromine to the solution for each mole of ε-benzamido-caproic acid, maintaining a reaction temperature of 90° to 100° C. until bromination is essentially complete, cooling the reaction mixture, mixing the cooled solution with dilute aqueous sodium hydroxide in amount sufficient to form a solution of sodium ε-benzamido-α-bromocaproate, separating the aqueous solution from the ethylene bromide layer, acidifying the aqueous solution and separating therefrom the ε-benzamido-α-bromocaproic acid in substantial purity.

(References on following page)

References Cited in the file of this patent

UNITED STATES PATENTS

| | | |
|---|---|---|
| 2,109,929 | Rigby | Mar. 1, 1938 |
| 2,195,712 | Jacobson | Apr. 2, 1940 |
| 2,230,351 | Hill | Feb. 4, 1941 |
| 2,519,038 | Galat | Aug. 15, 1950 |
| 2,548,764 | Ayers et al. | Apr. 10, 1951 |
| 2,561,574 | Howe et al. | July 24, 1951 |

OTHER REFERENCES

Eck et al.: "Organic Syntheses," Coll. vol. 2, pp. 74–5 (1943).

Howe et al.: J. Am. Chem. Soc., vol. 71, p. 2581 (1949).